(12) United States Patent
Liao et al.

(10) Patent No.: US 6,606,663 B1
(45) Date of Patent: Aug. 12, 2003

(54) METHOD AND APPARATUS FOR CACHING CREDENTIALS IN PROXY SERVERS FOR WIRELESS USER AGENTS

(75) Inventors: Hanqing Liao, San Ramon, CA (US); Peter F. King, Half Moon Bay, CA (US); Russell S. Greer, Los Gatos, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/163,050

(22) Filed: Sep. 29, 1998

(51) Int. Cl.7 .............................................. G06F 15/16
(52) U.S. Cl. .......................... 709/229; 705/25; 713/201
(58) Field of Search .................................. 709/229, 217, 709/213; 707/201, 202; 705/25; 713/156, 201

(56) References Cited

U.S. PATENT DOCUMENTS

| | | | |
|---|---|---|---|
| 5,077,790 A | * 12/1991 | D'amico et al. ............... | 380/23 |
| 5,235,642 A | * 8/1993 | Wobber et al. .............. | 713/156 |
| 5,586,260 A | * 12/1996 | Hu .............................. | 713/201 |

(List continued on next page.)

FOREIGN PATENT DOCUMENTS

WO    WO 98/37661    *    8/1998   .............. H04L/9/00

OTHER PUBLICATIONS

Patiyoot et al., "Techniques for Authentication Protocols and Key Distribution on Wireless ATM Networks", Oct. 1998, ACM SIGOPS Operating Systems Review, vol. 32, Iss. 4, pp. 25–32.*

Geng et al., "Defending Wireless Infrastructure Against the Challenge of DDoS Attacks", Jan. 2002, Mobile Networks and Applications, vol. 7, Iss. 3, pp. 213–223.*

Molva et al., "An authentication protocol for mobile users", 1994, IEE, pp. 4/1–4/7.*

Lin et al., "A Wireless–based Authentication and Anoymous Channels for Large Scale Area", 2001, IEEE, pp. 36–41.*

Lobo et al., "Fixed Network Call Setup Delay in a PCN Architecture with ATM Transport", 1997, IEEE, pp. 1566–1571.*

(List continued on next page.)

*Primary Examiner*—Bunjob Jaroenchonwanit
(74) *Attorney, Agent, or Firm*—Blakely, Sokoloff, Taylor & Zafman LLP (57) ABSTRACT

A credential caching proxy server that handles credential caching for a set of wireless client devices is disclosed. The credential caching proxy server handles most credential transactions for wireless client devices that wish to access resources within a protected realm where the protected realm requires credentials. In one embodiment, the credential caching proxy server intercepts and caches a wireless client's credentials when a credential is first sent from the wireless user agent to a protected server. The cached credential will then be used for all requests to resources within the same protected realm. Thus, after first sending a first credential for accessing the resource in a particular realm, the wireless user agent does not need to attach the credential for all the subsequent requests for any other resources belong to the same realm. In an alternate embodiment, the proxy server sends a special request to the wireless client device requesting a credential for a particular resource. The special request may take the form of a simple preformatted display page such that a "dumb terminal" wireless client device can be used to communicate with protected Internet resources even though the "dumb" wireless client device has no concept of authentication and authorization.

42 Claims, 3 Drawing Sheets

U.S. PATENT DOCUMENTS

| | | | | | |
|---|---|---|---|---|---|
| 5,608,909 | A | * | 3/1997 | Atkinson et al. | 717/3 |
| 5,673,322 | A | | 9/1997 | Pepe et al. | |
| 5,675,629 | A | * | 10/1997 | Raffel et al. | 455/552 |
| 5,740,361 | A | * | 4/1998 | Brown | 713/201 |
| 5,764,887 | A | * | 6/1998 | Kells et al. | 713/200 |
| 5,826,021 | A | * | 10/1998 | Mastors et al. | 707/202 |
| 5,892,905 | A | * | 4/1999 | Brandt et al. | 713/201 |
| 5,911,120 | A | * | 6/1999 | Jarett et al. | 455/417 |
| 5,923,756 | A | * | 7/1999 | Shambroom | 713/156 |
| 6,006,018 | A | * | 12/1999 | Burnett et al. | 709/200 |
| 6,052,785 | A | * | 4/2000 | Lin et al. | 713/201 |
| 6,065,120 | A | * | 5/2000 | Laursen et al. | 705/27 |
| 6,075,860 | A | * | 6/2000 | Ketcham | 380/270 |
| 6,148,405 | A | * | 11/2000 | Liao et al. | 713/201 |
| 6,263,437 | B1 | * | 7/2001 | Liao et al. | 713/169 |
| 2002/0007317 | A1 | * | 1/2002 | Callaghan et al. | 705/26 |
| 2002/0019985 | A1 | * | 2/2002 | Fuccello et al. | 725/133 |

OTHER PUBLICATIONS

Prasad et al., "Security Architecture for Wireless LANs: Corporate & Public Environment", 2000, IEEE, pp. 283–287.*

R. Fielding, et al., Hypertext Transfer Protocol, Jan. 1997, Downloaded from http://src.doc.ic.ac.uk/computing/internet/rfc/rfc2068.txt., pp. 140.

RFC 2068 Hypertext Transfer Protocol—HTTP/1.1., R. Fielding, et al., Jan. 1997, pp. 1–162 (162).

Database UBET Online! Network working group. Request for comments 2068, Jan. 1, 1997. R. Fielding et al.: *Hypertext Transfer Protocol HTTP/1.1* Retrieved from Internet: URL:HTTP://WWW.IETF.ORG/RFC/RFC2068.TXT XP00 2130469 p. 108.

* cited by examiner

METHOD AND APPARATUS FOR CACHING CREDENTIALS IN PROXY SERVERS FOR WIRELESS USER AGENTS

FIELD OF THE INVENTION

The present invention relates to the field of wireless data communication systems. In particular the present invention discloses a method and apparatus for caching credentials in proxy servers used by wireless client devices when accessing protected resources.

BACKGROUND OF THE INVENTION

To enable commercial transactions on the global Internet, the parties communicating with each other must be able to authenticate each other. Specifically, each party in a transaction must be certain that the person at the other end of the transaction is who that party claims to be. One method of authenticating a client system that is attempting to connect to a server system is to require that the client system provide a credential. A credential is the authentication information used to authenticate a user who wants to access a protected resource such as a server.

A typical credential is a userid (user identifier) and password pair. Another common credential is a derived form of the userid and password pair such as a base-64 encoded userid and password pair. For example, in the Internet environment, a base-64 encoded userid and password pair credential is widely used by World Wide Web servers to authenticate client users before access to the desired server is allowed. Each World Wide Web server communicates with the well-known HTTP protocol [RFC2068] and provides varieties of resources such as HTML documents. Each resource is identified by URI or URL[RFC2068].

To protect a group of Internet resources from unauthorized access, those resources are grouped into "realms". Each realm consists of a set of Internet resources that define a protected space. When a user wants to access any resource within a particular realm, the user must provide a credential that authenticates the user as an entity that is authorized to access resources within the realm.

HTTP protocol defines a standardized manner for a user agent to submit a credential to an Internet server known as Basic Authentication. Basic Authentication is defined in the IETF's RFC 2068. In the basic authentication system, a user agent, also known as the web client or the web browser, first accesses a protected resource as identified by the URL without providing any credentials within the initial request. The Internet server denies access and sends back a status code 401 along with an HTTP header "WWW-Authenticate:" that requests a credential to access the protected realm. The response with the "WWW-Authenticate:" header comprises a challenge response that includes a text string identifying the realm the user agent is attempting to access.

The user agent (the web client or web browser) may then prompt the user to enter the credential information (a userid and password). After receiving credential information, the user agent then resubmits the denied request along with the required credential information in an HTTP header "Authorization:" field. If the credential authenticates the user as an entity that is allowed to access resources within the realm, then the Internet server grants access to the protected resources within the realm. The user agent (the web client or web browser) may cache the credential so that user agent will automatically attach the credential in any subsequent requests to any other resources within the same realm without the need for user intervention.

In a wireless environment, the user agent (a thin client or a micro browser) exists on a wireless client device such as a cellular phone or a personal digital assistant (PDA) with wireless communication capabilities. In such an environment, the user agent has the limited processing power and limited memory. Furthermore, the amount of communication bandwidth is low and the cost of the communication bandwidth is high. Since the basic authentication systems defined in RFC2068 requires the credentials to be continually passed with each request, the basic authentication system is not efficient for a wireless environment wherein the wireless client devices have limited processing power and limited memory and the wireless infrastructure has limited data communication bandwidth.

SUMMARY OF THE INVENTION

The present invention introduces a proxy server that handles credential caching for a set of wireless client devices that wish to access protected resources on a second network where the protected resources require credentials. In one embodiment, the proxy server intercepts and caches a wireless client's credentials when a credential is first sent from the wireless user agent to a protected server on the Internet. To intercept the credential, the proxy server locates the credential in the headers of messages from wireless client devices wherein the examined credential headers are equivalent to the HTTP "Authorization:" header. Once a credential for a particular realm is found, the proxy server caches it in the memory (short term or long term) of the proxy server. The cached credential will then be used for all requests to resources within the same realm. Thus, after first sending a first credential for accessing the resource in a particular realm, the wireless user agent does not need to attach the credential for all the subsequent requests for any other resources belong to the same realm.

In an alternate embodiment, when the proxy server needs a credential (perhaps due to a refused request), the proxy server sends a special request to the wireless client device requesting a credential for a particular resource. The special request may take the form of a simple preformatted display page such that a "dumb terminal" wireless client device can be used to communicate with protected Internet resources even though the "dumb" wireless client device has no concept of authentication and authorization.

The teachings of the present invention provide several advantages. One of the most important advantages of the present invention is that the present invention reduces the number of bits and bytes that must be transmitted over the low bandwidth and expensive wireless communication infrastructure since a credential does not need to be sent for every request into a protected realm. Furthermore, the present invention reduces the amount of memory used within each wireless client device since the wireless user agent does not have to implement the mechanism for saving the credentials nor does the wireless client device need to reserve memory to store the credentials. The present invention also relieves the wireless client device user from entering the credentials over and over again for accessing protected resources that belong to the same protected realm.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following is presented largely in terms of procedures, steps, logic blocks, processing, and other symbolic representations that resemble data processing devices coupled to networks. These process descriptions and representations are the means used by those experienced or skilled in the art to most effectively convey the substance of their work to others skilled in the art. The method of the present invention along with the apparatus to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

A Wireless Data Network

Figure 1:
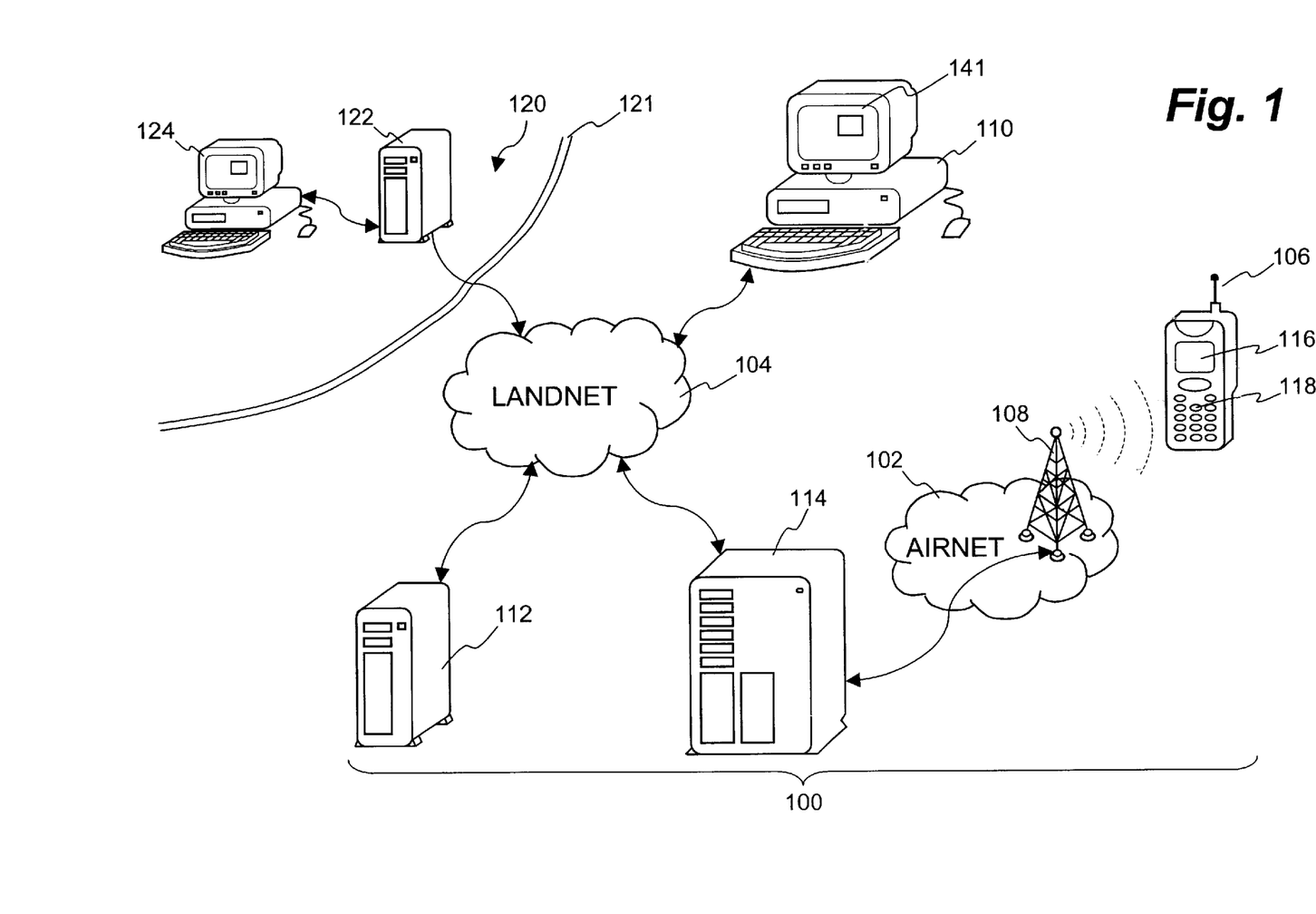
FIG. 1 illustrates a schematic configuration in which the present invention may be practiced.

Referring now to the drawings, in which like numerals refer to like parts throughout the several views. FIG. 1 illustrates a schematic configuration in which the present invention may be practiced. A data network 100 comprises an airnet 102 that is generally called wireless network and a landnet 104 that is generally a landline network, each acting as a communication medium for data transmission therethrough. Airnet 102, in which the data transmission is via the air, is sometimes referred to as a carrier network as well because each airnet is controlled and operated by a carrier, for example AT&T and GTE, each having its own communication scheme, such as CDPD, CDMA, GSM and TDMA for airnet 102. The airnet 102 may comprise more than one different types of wireless network. For example, the airnet 102 may comprise a GSM wireless network for some wireless client devices and a CDPD wireless network for other wireless client devices.

Referenced by 106 is one of the two-way interactive communication devices that can be a mobile device, a cellular phone, a wireless personal digital assistant, or a wireless capable remote controller, capable of communicating, via airnet 102, with an antenna 108 that also represents a carrier infrastructure. It is generally understood that the carrier infrastructure or antenna 108 serves simultaneously a plurality of the two-way interactive communication devices, of which only one mobile device 106 is shown in the figure. Similarly, connected to Internet 104 are a plurality of desktop personal computers (PC) 110 and a number of information server computers 112 (such as web servers), though only one representative, respectively, is shown in the figure. Personal computer system 110, as shown in the figure, may be an Intel processor based personal computer from Dell Computer, Inc. The personal computer system can execute a HTML Web browser such as the Netscape Navigator in order to communicate via the Internet 104 using HTTP to access information stored in information server 112 that may be a workstation from Sun Microsystems Inc. It is understood to those skilled in the art that personal computer 110 can store accessible information therein so as to become an information server as well.

Between the Internet 104 and the airnet 102 there is a link infrastructure that comprises a proxy server device 114 and one or more wireless carrier infrastructures 108. The proxy server device 114, also referred to as proxy server or wireless data server or gateway server, may be a workstation or a personal computer and performs mapping or translation functions. For example, the proxy server may map from one network protocol to another network protocol. Using the proxy server 114, a mobile device 106 may communicate with any one of the computer servers 112 or the personal computers 110 on the Internet via the wireless carrier infrastructure 108. The proxy server 114 may host many other applications that may be used by mobile devices and computer coupled to the Internet 104.

The wireless carrier infrastructure 108 generally comprises a base station and an operation center for each type of wireless network supported. The base station controls radio or telecommunication links with the mobile devices. The operation and maintenance center comprises a mobile switching center performing the switching of calls between the mobile devices and other fixed or mobile network users. Further, the operation and maintenance center manages mobile services, such as authentication and oversees the proper operation and setup of a wireless network. Each of the hardware components and processes in the base station and the operation and maintenance center for each type of wireless network is known to those skilled in the art and not to be described herein to avoid unnecessarily obscuring aspects of the present invention.

The communication protocol of the World Wide Web (WWW) on the Internet 104 is the well-known HyperText Transport Protocol (HTTP) or HTTPS, a secure version of HTTP. HTTP runs on top of the Transport Control Protocol (TCP) and the Internet Protocol (IP). HTTP is used to transfer information in the forms such as HTML and HDML between the proxy server 114 and one the HTML web servers that reside in the computers 110, 112, or 122.

The communication protocol between mobile computing device 106 and proxy server 114 via airnet 102 may be one of the protocols specific to a wireless network. Examples of the protocols may include Wireless Session Protocol (WSP) and Handheld Device Transport Protocol (HDTP). WSP or HDTP preferably runs on User Datagram Protocol (UDP) is used to control the connection of a browser program in mobile device 106 to proxy server 114. The browser program in the mobile device 106 may support one or more of markup languages, such as Wireless Markup Language (WML), Handheld Device Markup Language (HDML) and compact HyperText Markup Language (cHTML). Similar to regular HTML, cHTML, WML or HDML language is a tag based document language that comprises a set of commands or statements specified in a card that specifies how information is to be displayed on a small screen of the mobile device 106. To facilitate the description of the present invention according to one embodiment, WML and HDML will be considered below. The browser that supports both WML and HDML and operates on both WSP and HDTP may be obtained from Unwired Planet, Inc. located at 800 Chesapeake Drive, Redwood City, Calif. 94063.

Normally a number of cards are grouped into a deck that is the smallest unit of HDML information that can be exchanged between the mobile device 106 and the proxy server 114. The specifications of HDTP, entitled "HDTP Specification" and HDML, entitled "HDML 2.0 Language Reference" are enclosed and incorporated herein by reference in their entirety. Furthermore, additional information about the Wireless Session Protocol (WSP) and the Wireless Mark-up language (WML) can be found in the Wireless Application Protocol Forum at http://www.wapforum.orq/.

WSP and HDTP are a session-level protocols that are similar to HTTP, but WSP and HDTP are designed to incur less overhead since HDTP are designed for use in lower bandwidth wireless environments. For example, the WSP and HDTP protocols have been designed to minimize the number of packets that need to be exchanged when, negotiating a connection between a wireless client device and a wireless server before information can be exchanged. Furthermore, WSP and HDTP are optimized for use within thin client devices, such as mobile computing devices including cellular phones and personal digital assistants. Mobile computing devices typically have significantly less computing power and memory than desktop personal computers. Exchanging a very small number of packets is one of the desired features for a mobile device with very limited computing power and memory in order to effectively interact with a landline device.

A Wireless Computing Device

To facilitate the description of the disclosed system, some of the features in mobile computing device 106 are recited. According to one embodiment, mobile computing device 106 is a mobile phone. Mobile phone 106 comprises a display screen 116 and a keyboard pad 118 that allow a user thereof to communicate interactively with the mobile phone. The digital hardware components including a microcontroller, a ROM, and RAM in mobile phone 106 are known to those skilled in the art.

The compiled and linked processes are typically stored in the ROM as a client module that causes mobile device 106 to communicate with proxy server 114. With display screen 116 and keypad 118, a user of mobile device 106 can interactively communicate with proxy server 114 over airnet 102. Upon activation of a predetermined key sequence utilizing keypad 118, for example, the microcontroller initiates a communication session request to proxy server 114 using the client module in the ROM. Upon establishing the communication session, mobile device 106 typically receives a single HDML or WSP deck from proxy server 114 and stores the deck as cached in the RAM. As described above, an HDML deck comprises one or more cards. Each card includes the information required to generate a screen display on display screen 116. The number of cards in a card deck is selected to facilitate efficient use of the resources in mobile device 106 and in airnet network 102.

Internet Proxy for A Wireless Data Network

Figure 2:
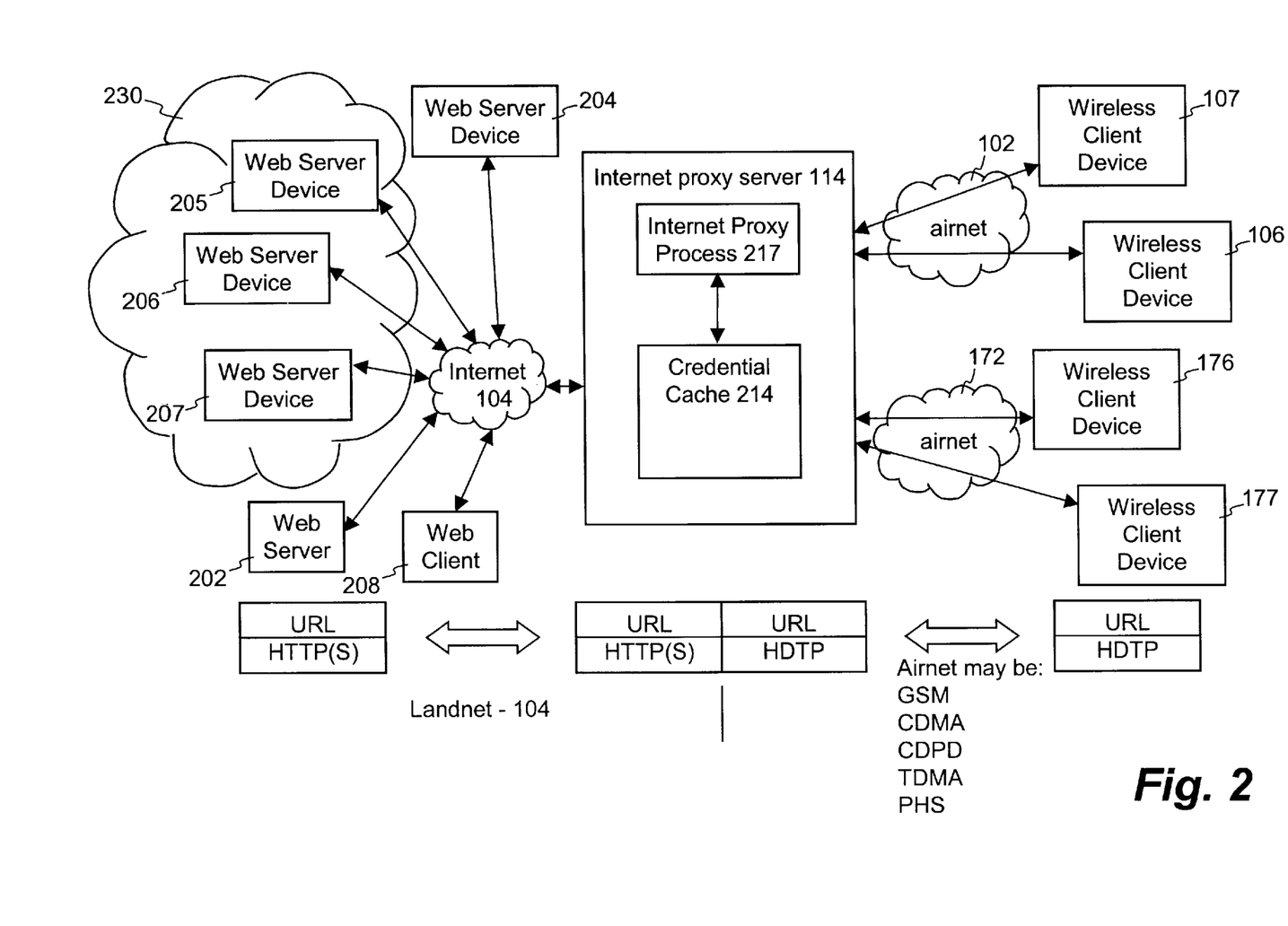
FIG. 2 illustrates a functional diagram of an Internet proxy system for wireless client device wherein a credential cache is provided.

Referring now to FIG. 2, there is shown a functional block diagram of an Internet proxy system for multiple wireless devices. Web server devices (202, 204, 205, 206, and 207) provide information accessible to other computing devices on the Internet 104. A first wireless mobile device 106 and a second wireless mobile device 107 access the information in the web server devices (202, 204, 205, 206, and 207) coupled to the Internet via Internet proxy server device 114 through first wireless network 102.

The actual Internet communication and translation is performed by Internet Proxy Process 217. The Internet Proxy Process 217 uses an Internet Protocol (IP) address for communicating with other devices coupled to the Internet 104. FIG. 2 further illustrates a third wireless mobile device 176 and fourth wireless mobile device 177 that access the information in web server devices (202, 204, 205, 206, and 207) via Internet proxy server device 114 through a second wireless network 172. The second wireless network 172 has different properties than the first wireless network 102. Thus, Internet Proxy process 217 may be responsible for providing Internet access to several wireless clients that communicate using different wireless infrastructures.

To avoid possible ambiguities in further description of the present invention, each server device, such as web server devices (202, 204, 205, 206, and 207) and proxy server device 114, refers to a piece of hardware equipment that comprises one or more microprocessors, working memory, buses and necessary interface and other components that are familiar to those skilled in the art while a server module means compiled and linked processes of the disclosed system loaded into the working memory to perform designated functions, according to the invention, through the parts and components in the server device. Additional details on the design, construction, and operation of one possible proxy server embodiment is described in commonly assigned U.S. application Ser. No. 08/978,701, entitled "Method and Architecture for an Interactive Two-way Data Communication Network" by Alain Rossmann, and U.S. application Ser. No. 09/071,235, entitled "Method and System for Integrating Narrowband and Wideband Data Transports", by Stephen S. Boyle, et al, filed on Apr. 30, 1998, which is incorporated herein by reference in their entirety.

Internet HTTP Basic Authentication

As previously set forth, a number of services available on the global Internet require that a user authenticate itself as an entity that is allowed to access the particular service. For example, when an investor wishes to access his brokerage account on a brokerage house's server, the investor is required to authenticate himself before access to the brokerage account is granted. The user's web browser will request the user to enter a set of credentials comprising a userid (username) and a password. The web browser will then submit the credentials when communicating with the brokerage house's servers.

The standard method of authenticating a client system is to use the basic authentication system set forth in version 1.1 of the HTTP specification available in the Internet Engineering Task Force (IETF) Request For Comments (RFC) document 2068. In the RFC 2068 defined basic authentication system, a protected server will request a client to authenticate itself by sending a response with a header that requests the authentication for a particular realm such as WWW-Authenticate: Basic realm="WallyWorld"

The client should respond with a request that contains a header having a proper authorization credential that is encoded with base64 encoding. For example, If the user agent wishes to send the userid "Aladdin" and password "open sesame", it would use the following authorization header field:

Authorization: Basic QWxhZGRpbjpvcGVuIHNlc2FtZQ==

If the protected server approves the authentication credential, the protected server will process the request. For all subsequent requests to servers within the same protected realm, the client is recommended to include the same authorization header field to avoid the request being denied for lack of authorization.

To prevent the user from being forced enter the credentials for every subsequent request, the user agent (the web client or web browser) may cache the credential along with the name of the realm. Thus, for all subsequent requests to servers within that same realm, the user agent automatically attaches the authorization credential without the need for user intervention.

Cached Authentication for Wireless Devices

As set forth in the previous section, a number of services available on the global Internet require that a user authenticate itself before access to a protected service. With the Basic Authentication system defined in RFC 2068, authentication credentials must be sent along with every request to a resource within a protected realm. In a wireless communication environment where the communication overhead must be kept to a minimum, the present invention proposes eliminating the majority of authentication requests and authorization response that are transmitted. Specifically, in the present invention the proxy server that handles communication between the wireless client devices and resources on the Internet is used to cache credentials.

The proxy server intercepts and caches a wireless client's credentials when a credential is first sent from the wireless user agent to a protected Internet server. To intercept the credential, the proxy server looks up the credential in the HDTP or WSP headers that are equivalent to the HTTP "Authorization:" header in the request from the wireless user agent. Once the credential for a particular realm is found, the credential is cached in the memory (short term or long term) of the proxy server. After first sending the credential for accessing the resource in a particular realm, the wireless user agent does not need to attach the credential for all the subsequent requests for any other resources belong to the same realm. The proxy server retrieves the credential from its cache by using the URL that a particular request is being directed towards. If the URL belongs to a known protect realm that the proxy server has a credential for, then the proxy server attaches the credential for that realm to the request and the request is forwarded to the Internet server.

The teachings of the present invention provide several advantages. First, the present invention reduces the number of bits and bytes that must be transmitted over the low bandwidth and expensive wireless communication infrastructure since a credential does not need to be sent for every request into a protected realm. Second, the present invention reduces the amount of memory used within each wireless client device since the wireless user agent does not have to implement the mechanism for saving the credentials nor store the credentials. Third, the present invention reduces the number of messages sent across the wireless communication if the wireless user agent does not have a credential caching mechanism. Finally, the present invention relieves the user from entering the credentials over and over again for accessing the resources that belong to the same realm if the wireless user agent does not have the caching mechanism or the size of the cache in the wireless client device is small.
Implementation Summary Referring back to FIG. 2, to implement a credential caching system, the Internet Proxy Process 217 is programmed to use a credential cache 214 for every request sent from wireless client devices to Internet resources. Specifically, the Internet Proxy Process 217 is programmed to look for authorization credentials in each request. If a new credential is detected, then the Internet Proxy Process 217 stores the new credential contained in the headers of request into a credential cache 214. If the Internet Proxy Process 217 does not detect an authorization header with a credential, then the Internet Proxy Process 217 examines the credential cache 214 to determine if the Internet Proxy Process 217 has previously cached a credential for the Internet resource that is being accessed. If the Internet Proxy Process 217 locates a credential for the Internet resource being accessed, the credential is attached to the request through the HTTP "Authorization:" header and forwarded to the desired Internet resource.

For example, if wireless client device 106 wishes to communicate with web server 206 within protected realm 230, the wireless device 106 must provide a credential. The credential may be supplied during an initial request (perhaps the wireless device 106 cached the credential) or the credential may be supplied in response to a message from web server 206 that specifies that access has been denied using the well known HTTP 401 status code. When the Internet Proxy Process 217 sees the credential in a request from the wireless device 106, the Internet Proxy Process 217 stores the credential into credential cache 214. On all subsequent accesses to web server 206, the wireless device 106 does not need to provide a credential since the Internet Proxy Process 217 will automatically insert the credential from the credential cache 214. Furthermore, if the wireless device 106 accesses web server 205 or web server 207, the wireless device 106 still does not need to provide a credential. No credential is required since web server 205 and web server 207 reside within the same protected realm as web server 206 such that the Internet Proxy Process 217 will automatically insert the credential from the credential cache 214
An Example Cached Credential Transaction To fully describe the teachings of the present invention, a typical cached credential transaction will be described with reference to an exemplary transaction between a wireless client device, the Internet proxy server, and a protected Internet server. In the example, it is assumed that the proxy server has been configured in a manner such that the wireless user agent must explicitly request caching of credentials in order for the proxy server to perform the caching functions. It should be noted that wireless client device, has the option not to enable the credential caching function in the proxy server and that the proxy server has the option to enable the credential caching regardless if the wireless user agent caches the credentials.

Figure 3:
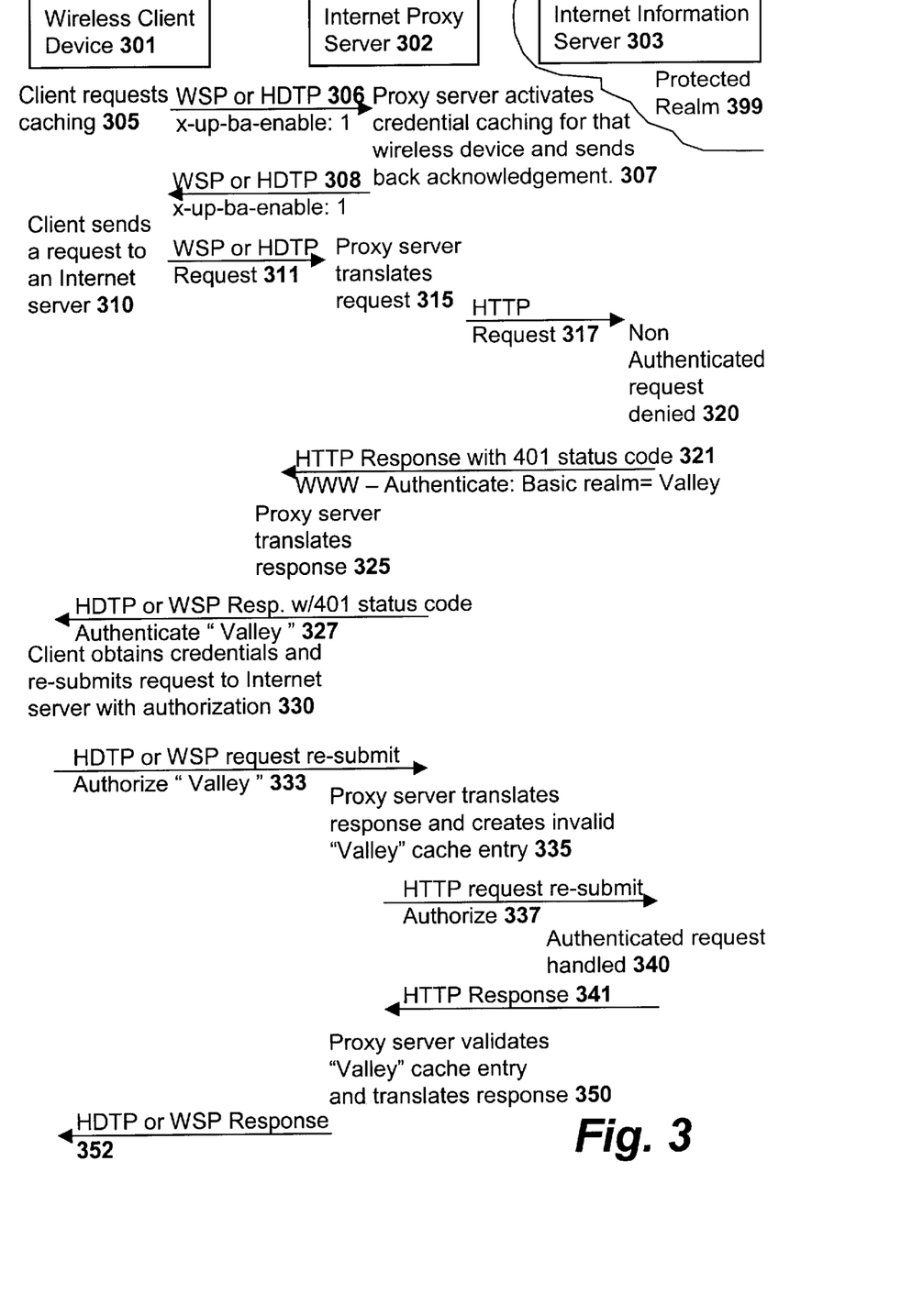
FIG. 3 illustrates a flow diagram that describes how a wireless client accesses an Internet information server within a protected realm and the proxy server automatically caches the credentials used to access the Internet information server.

Referring to the top of FIG. 3 the three units involved in an authenticated transaction are displayed: a wireless client device 301, an Internet proxy server 302, and a protected Internet server 303. Beneath the three units, a series of steps for each unit and messages sent between the units will be described.

To enable proxy server credential caching for a particular wireless client device, the wireless user agent makes a request that contains a request for proxy caching of credentials as stated in step 305. In the embodiment of FIG. 3, the wireless agent makes such a request by including the header "x-up-ba-enable: 1" in a WSP session creation message 306. Responding to the proxy caching enable request, the proxy server 302 enables credential caching for that particular wireless client device at step 307. At this time, the proxy server 302 may create an empty cache record associated with the wireless client device's account for storing credentials. The proxy server 302 then confirms that responding to the session creation request with the same "x-up-ba-enable: 1" header that has enabled caching in the response message 308 to the session creation request. When this negotiation is done, both the wireless user agent 301 and the proxy server 302 have agreed that the caching of credentials will be performed by the proxy server 302 so that the wireless user agent 301 does not need to perform caching.

After proxy caching of credentials has been enabled, the proxy server 302 examines all subsequent requests and determines if a cached credential should be attached to the request before the request is translated from WSP or HDTP into HTTP forwarded to the desired Internet information server. The examination of each request comprises examining the known protected realms in the cache to see if the destination URL of the request belongs to one of the known protected realms. If the requested URL belongs to a cached realm, the proxy server 302 will attach the credential associated with that realm by using the HTTP header "Authorization:" and forwards the request to the desired server.

In one particular embodiment, the proxy server 302 parses the URL of the request to obtain the Internet host name and the path of the desired resource in order to determine if the URL request belongs to a protected realm in the cache. The proxy server 302 then uses host name and path pair to attempt to locate a matching entry in the credential cache. The host name must exactly match the host name in a cache entry in order for a cache "hit" to occur. The path comparison is performed using root path comparison. Specifically, there will only be a path match if the path in the cached entry is a root path of the path in the URL. For example, a cache entry containing the path "/alpha/beta" will match a request having the path "/alpha/beta/gamma" for the purpose of the present invention because "/alpha/beta" is the root path of "/alpha/beta/gamma". If an entry in the credential cache matches both the host name and path then the requested resource specified by the URL belongs to the protected realm associated with the cache entry having the matching host name and the path pair. In one embodiment, each entry may include a TCP port number. In such an embodiment, the port number must also match exactly to identify a matching entry.

If no realm containing the destination URL is found in the credential cache, the proxy server 302 just forwards the URL request to the origin server. An example of this is illustrated at step 310 where the wireless client agent in the wireless client device 301 sends a request 311 destined for Internet information server 303 to the proxy server 302. The proxy server 302 then examines the request and determines that URL is not within any known protected realm since at this point in the example there are no known protected realms in the proxy server's credential cache. Thus, the proxy server 302 just translates the request at step 315 and passes the translated request 317 to the destination URL, Internet information server 303.

In the example of FIG. 3, the Internet information server 303 is within a protected realm 397. When the translated request 317 reaches the Internet information server 303 within protected realm 399, the Internet information server 303 will deny the request as stated in step 320. To deny the request, the Internet information server 303 sends a response message 321 that contains the well known HTTP status code 401 that indicates accesses has been denied because the access can not be authorized. The response message also includes an authenticate challenge by including the HTTP "WWW-Authenticate:" header which challenges the recipient to provide an authorization credential. In the example of FIG. 3, the HTTP "WWW-Authenticate:" header specifies that the basic authentication system is being used. The HTTP "WWW-Authenticate:" header also specifies a name of the realm that is being accessed. In the example of FIG. 3, the name "Valley" assigned to the protected realm is passed in the challenge authenticate header.

When the proxy server 302 receives an authenticate challenge message from an Internet server such as Internet information server 303, the proxy server 302 may first look up and examine the credential cache using the realm specified in the challenge message. If a matching cache entry for that realm is found, the proxy server 302 retrieves the credential information associated with the realm and re-submits the HTTP request by setting the "Authorization:" header that carries the credential retrieved from the credential cache. A new cache entry will be created in the credential cache when the HTTP request is succeeded. The new cache entry for the credential is first created in the cache as the proto entry. After the HTTP request is proved successful, the proto cache entry is validated and its status is promoted from proto to valid. A proto cache entry simply means that further validation is required before the cache entry can be used for other requests that access the resources in the same realm. The cache entry may contain the host name, the realm name, the credential, the path, and the port. The duplicated cache entry may be removed when it is detected. However, if no credential is found within the cache, the proxy server 302 translates the authenticate challenge response as stated in step 325. The proxy server 302 forwards translated authenticate challenge message 327 to the wireless user agent through WSP along with a corresponding WSP or HDTP "Authenticate:" header that carries the challenge to the wireless user agent. It should be noted that the WSP or HDTP response 327 with the authenticate challenge includes the name of the realm to be accessed ("Valley").

After receiving the response 327 with the authenticate challenge, the wireless client agent examines a local cache of credentials using the name of the realm to be accessed. If the local client cache has an entry for the specified realm, then the wireless client agent resubmits request 333 along with the authorization information from the credential cache, which are carried in the WSP header "Authorization:".

If the local client cache does not include credential information for the specified realm or if the user agent does not have a credential cache, then the user agent asks the user for credentials to access the specified URL. After the user provides the credentials for the desired resource (Internet information server 303), the wireless client agent resubmits the request 333 along with the credential information as the user entered. When the wireless client device 301 re-submits the request 333, it includes the WSP "Authorization:" header that carries the credential information in the request to the Internet information server 303 through the proxy server 302. The re-submitted request also includes the name of the realm ("Valley" in this example). In one embodiment, the wireless client device 301 specifies the realm in a "x-up-ba-realm:" header in the re-submitted WSP or HDTP request 333.

When the proxy server 302 receives the credentials being submitted in the "Authorization:" header, the proxy server 302 creates a proto credential cache entry in the credential cache as stated in step 330. The credential cache entry comprises the actual credential (usually a userid and password pair), the name of the realm, the name of the host server from the URL, the path name from the URL, and the port being accessed. At minimum, each cache entry must contain the credential and the name of the protected realm. For example, if the wireless client device 301 is accessing the Internet information server 303 in the "Valley" realm using the internet URL "https://www.uplanet.com:8200/alpha/beta" with the userid "Aladdin" and the password "sesame" then the credential cache stores a proto cache entry with the credential "Aladdin/sesame" (the userid and password pair), the realm name "Valley", the host name "www.uplanet.com", the path "/alpha/beta", and the TCP port "8200". At a minimum, the credential entry must contain the credential "Aladdin/sesame" and the realm name "Valley". Note that the realm name ("Valley") is obtained from the "x-up-ba-realm:" header in the re-submitted WSP or HDTP request 333. The newly created credential cache entry is marked as proto since the user (or the wireless client device) may have provided a credential that is not validated until the corresponding HTTP request succeeds.

After creating the proto credential cache entry, the proxy server 302 translates the re-submitted WSP or HDTP request 333 into an HTTP request 337 with an HTTP"Authorization:" header. The translated HTTP request 337 with an HTTP "Authorization:" header is sent to the Internet information server 303. Assuming that the correct credentials for the realm were provided in the re-submitted WSP or HDTP request 333, the Internet information server 303 then processes the request at step 340. The Internet information server 303 then responds with a normal HTTP response 341.

In response to the normal response that indicates the authorization succeeded, the proxy server 302 validates the recently created proto credential cache entry at step 350. The validation step promotes the proto cache entry as the valid cache entry in the credential cache so that it can be reused for all other requests that access the resources in the same realm. The proxy server 302 also translates the response and passes the translated HDTP or WSP response 352 to the wireless client device 301.

All the valid credential cache entries, including the newly validated credential cache entry, will then be examined when the proxy server receives the new requests from the wireless user agent in the future. A future request from the wireless client agent 301 may specify a resource within the same protected realm that was just placed into the cache. If a new request from the wireless client agent 301 is addressed belong to the same realm, then the proxy server 302 will automatically insert the cached credential into request before it is forwarded on the Internet. Because the proxy server holds the credential in its cache, the wireless client device 301 does not send the credential in the new requests to the proxy server.

Before a cache entry is validated, the proxy server 302 will examine to see if the newly created cache entry is a duplicate of an earlier credential cache entry. If the new credential cache entry is a duplicate of an earlier entry, then the older cache entry is removed. The newly created credential cache entry is considered a duplicate if the path of the newly created credential cache entry contains a path that is a root path to a path in an existing entry in the cache and all the other fields in the cache entry match. For instance, a new cache entry (name/password, "REALM", www.uplanet.com, /alpha, 8200) is a duplicated entry of an existing cache entry containing(name/password, "REALM", www.uplanet.com, /alpha/beta, 8200) since the request URL contains "/alpha" which is a root path of "/alpha/beta". In this example, name/password is the userid/password and "REALM" is the realm.

Implementation Details

Each credential placed into the credential cache does not remain in the cache indefinitely. The credentials expire using the cache expiration rules. In one embodiment, the wireless client device invalidates or deletes all cache entries when the WSP session has ended. A typical expiration time may be one day. However, the wireless client device may expire sooner than the WSP session cycle by using a short and fixed time period (e.g., every 30 minutes) for expiration if the proxy server chooses such policy. In another embodiment, each cache entry is given its own expiration time. The expiration time may be extended if a resource within a known protected realm is accessed before expiration time.

In one embodiment, the proxy server 302 may send a special credential request HDML or WML deck or preformatted display page. If an HDML or WML deck is used, the message will also contain the return address in the form of a special proxy URI such as like "uplink:". The special credential deck or page asks the user to enter a credential and directs the user agent to send a special request to the proxy server 302 The special request from the wireless client device 301 contains the credential, the realm, the host, the path, and the port number (if necessary). In such an embodiment, the credential caching system may be implemented even if the wireless client device is unaware of the basic authentication concepts. For example, a very simple browser may not implement authentication/authorization features. Furthermore, a "dumb terminal" type client device may not even implement a markup language interpreter such that the preformatted page is simply displayed on the screen and the request information is returned.

It should be noted that the credential caching system is not mandatory. If a particular wireless client device user does not trust the security of the credential caching system, then the user can turn off the proxy server credential caching. However, in one embodiment, the administrator has the power to override the wireless client device user's wishes. Specifically, the proxy server administrator has the option to force credential caching regardless if the wireless user agent caches the credentials. This option may be used during peak data traffic periods such that the data traffic is minimized.

The foregoing has described a method and apparatus for caching credentials in a proxy server environment. It is contemplated that changes and modifications may be made by one of ordinary skill in the art, to the materials and arrangements of elements of the present invention without departing from the scope of the invention.

We claim:

1. A method of caching credential information with a proxy server, said method comprising:

proxying to a set of client devices on a wireless network using a proxy server, a set of services on a wireline network;

enabling caching of credentials at a location accessible by the proxy server using a wireless user agent;

creating a credential cache accessible by said proxy server;

intercepting a first request to access a resource at a specified network locator on the wireline network using said proxy server, the first request transmitted by a client device and destined for a resource in said wireline network, the first request including a credential;

storing said credential in a credential entry in said credential cache if said credential is not present in the cache; and in response to receiving a subsequent request from the client device to access the resource on the wireline network:

accessing the credential stored in the credential cache; and sending the accessed credential for authentication to the resource with the subsequent request, such that the client device is not required to send the credential over the wireless network for the subsequent request to be satisfied.

2. The method as claimed in claim 1 wherein storing said credential in said credential cache comprises creating a proto credential entry, said credential is passed to said resource, and said proto credential entry is validated if said resource approves of said credential.

3. The method as claimed in claim 1 wherein each credential entry comprises a credential and a realm name.

4. The method as claimed in claim 3 wherein each credential entry further comprises a host name, a port number, and a path for a desired resource.

5. The method as claimed in claim 4 wherein said proxy server compares a desired host and desired path in future requests against said host name and said path in said cache entry.

6. The method as claimed in claim 1 further comprising:

informing said client device that said proxy server will perform credential caching such that said client device only sends each credential only once.

7. The method as claimed in claim 1 wherein said proxy server uses said stored credential for all subsequent accesses to said resource.

8. The method as claimed in claim 1 wherein said entries in said credential cache expire according to a set of defined expiration rules.

9. The method as claimed in claim 1 wherein said credential was sent by said client device after being denied access to said resource.

10. The method as claimed in claim 1 wherein said credential specifies a protected realm wherein the credential applies.

11. The method as claimed in claim 10 wherein said proxy server uses said stored credential for all subsequent accesses to resources within said protected realm.

12. The method of claim 1 wherein the wireless user agent is a web browser.

13. A method comprising:

enabling caching of credentials at a location accessible by an intermediary network node using a wireless user agent;

intercepting a first request destined for a resource at a specified network locator on a wireline network transmitted by a client device over a wireless network, the first request including an associated credential;

intercepting a subsequent request without the associated credential at the intermediary network node, the request transmitted by the client device over the wireless network and destined for a resource at a specified network locator on the wireline network; and, in response to the request:

using the intermediary network node to locate a cached credential associated with the client device; and sending the request with the cached credential from the intermediary network node to the resource over the wireline network, the resource authenticating the client device using the credential.

14. A method as recited in claim 13, wherein the intermediary network node comprises a proxy server to proxy requests from the client device to resources on the wireless network.

15. A method as recited in claim 13, wherein the credential comprises a username and password.

16. A method as recited in claim 13, wherein the credential is not cached if the user specifies that the credential is not to be cached.

17. The method of claim 13 wherein the wireless user agent is a web browser.

18. An intermediary network node comprising:

means for enabling caching of credentials at a location accessible by an intermediary network node using a wireless user agent;

means for intercepting a first request including an associated credential from a mobile device over a wireless network, the first request destined for a resource at a specified network locator within a protected realm on a wireline network;

means for intercepting a subsequent request without an associated credential at the intermediary network node from the mobile device over the wireless network, the request destined for a resource within the protected realm on the wireline network;

means for using the intermediary network node to locate in a credential cache a credential associated with the mobile client device in response to the subsequent request; and means for sending the subsequent request with the credential from the intermediary network node to the resource at the specified network locator over the wireless network, the resource authenticating the client device using the credential.

19. An intermediary network node as recited in claim 18, wherein the intermediary network node operates as a proxy server for proxying requests from the mobile client device to resources on the wireline data network.

20. An intermediary network node as recited in claim 18, wherein the credential comprises a username and password.

21. An intermediary network node as recited in claim 18, wherein the credential is not cached if the user specifies that the credential is not to be cached.

22. The network node of claim 18 wherein the wireless user agent is a web browser.

23. A method comprising:
receiving, at an intermediary network node enabled by a wireless user agent to store credentials, a credential from a client device over a wireless network, wherein the credential is associated with a first request by the client device destined for a first resource at a specified first network locator within a protected realm on a wireline network;
caching the credential in a credential cache using the intermediary network node if the credential is not present in the cache;
receiving, at the intermediary network node, a second request from the client device without an associated credential, the second request destined for a second resource at a specified second network locator within the protected realm on the wireline network;
using the intermediary network node to locate the cached credential in the credential cache in response to the second request; and
sending the cached credential with the second request from the intermediary network node to the resource over the wireline network, the resource authenticating the client device using the credential.

24. A method as recited in claim 22, wherein the intermediary network node comprises a proxy server to proxy requests from the client device to resource on the wireless network.

25. A method as recited in claim 23, wherein the credential comprises a username and password.

26. A method as recited in claim 23, wherein the credential is not cached if the user specifies that the credential is not to be cached.

27. A method as recited in claim 23, wherein the credentials in the credential cache expire according to a set of defined expiration rules.

28. The method of claim 23 wherein the wireless user agent is a web browser.

29. A method comprising:
creating a credential cache accessible by a proxy server enabled by a wireless user agent to cache credentials, the proxy server proxying to a set of client devices on a wireless network a set of services on a wireline network;
intercepting a first request to access a resource at a specified network locator on the wireline network using said proxy server, the first request transmitted by a client device and destined for a resource in said wireline network, the first request including a credential;
storing said credential in a credential entry in said credential cache if said credentials is not present in the cache; and
in response to receiving a subsequent request from the client device to access the resource on the wireline network:
accessing the credential stored in the credential cache; and
sending the accessed credential for authentication to the resource with the subsequent request, such that the client device is not required to send the credential over the wireless network for the subsequent request to be satisfied.

30. The method as claimed in claim 29 wherein storing said credential in said credential cache comprises creating a proto credential entry, said credential is passed to said resource, and said proto credential entry is validated if said resource approves of said credential.

31. The method as claimed in claim 29 wherein each credential entry comprises a credential and a realm name.

32. The method as claimed in claim 31 wherein each credential entry further comprises a host name, a port number, and a path for a desired resource.

33. The method as claimed in claim 32 wherein said proxy server compares a desired host and desired path in further requests against said host name and said path in said cache entry.

34. The method as claimed in claim 29 further comprising:
informing said client device that said proxy server will perform credential caching such that said client device only sends each credential only once.

35. The method as claimed in claim 29 wherein said proxy server uses said stored credential for all subsequent accesses to said resource.

36. The method as claimed in claim 29 wherein said entries in said credential cache expire according to a set of defined expiration rules.

37. The method as claimed in claim 29 wherein said credential was sent by said client device after being denied access to said resource.

38. The method as claimed in claim 29 wherein said credential specifies a protected realm wherein the credential applies.

39. The method as claimed in claim 38 wherein said proxy server uses said stored credential for all subsequent accesses to resources within said protected realm.

40. The method of claim 29 wherein the wireless user agent is a web browser.

41. A method comprising:
receiving, at a proxy server enabled by a wireless user agent to store credentials, a credential, comprising a user name and a password, from a mobile client device over a wireless network, wherein the credential is associated with a first request by the mobile client destined for a first resource at a specified first network locator within a protected realm on a wireline data network;
caching the credential in a credential cache if the credential is not present in the cache, wherein the credentials in the credential cache expire according to a set of defined expiration rules, using the proxy server unless the user specifies that the credential is not to be cached;
receiving, at the proxy server, a second request without an associated credential from the mobile client over the wireless network, the second request destined for a second resource at a specified second network locator within the protected realm on the wireline data network;
accessing the cached credential in the credential cache in response to the second request, using the proxy server; and
proxying the second request to the resource over the wireline data network, including sending the cached credential to the resource with the second request for authentication of the mobile client at the resource, such that the mobile client is not required to send the credential over the wireless network for the second resource to satisfy the second request.

42. The method of claim 41 wherein the wireless user agent is a web browse.

* * * * *